Feb. 15, 1955 B. C. WILDMAN 2,702,165
ADAPTER SLEEVE FOR MOTION-PICTURE FILM REWINDERS
Filed May 29, 1953
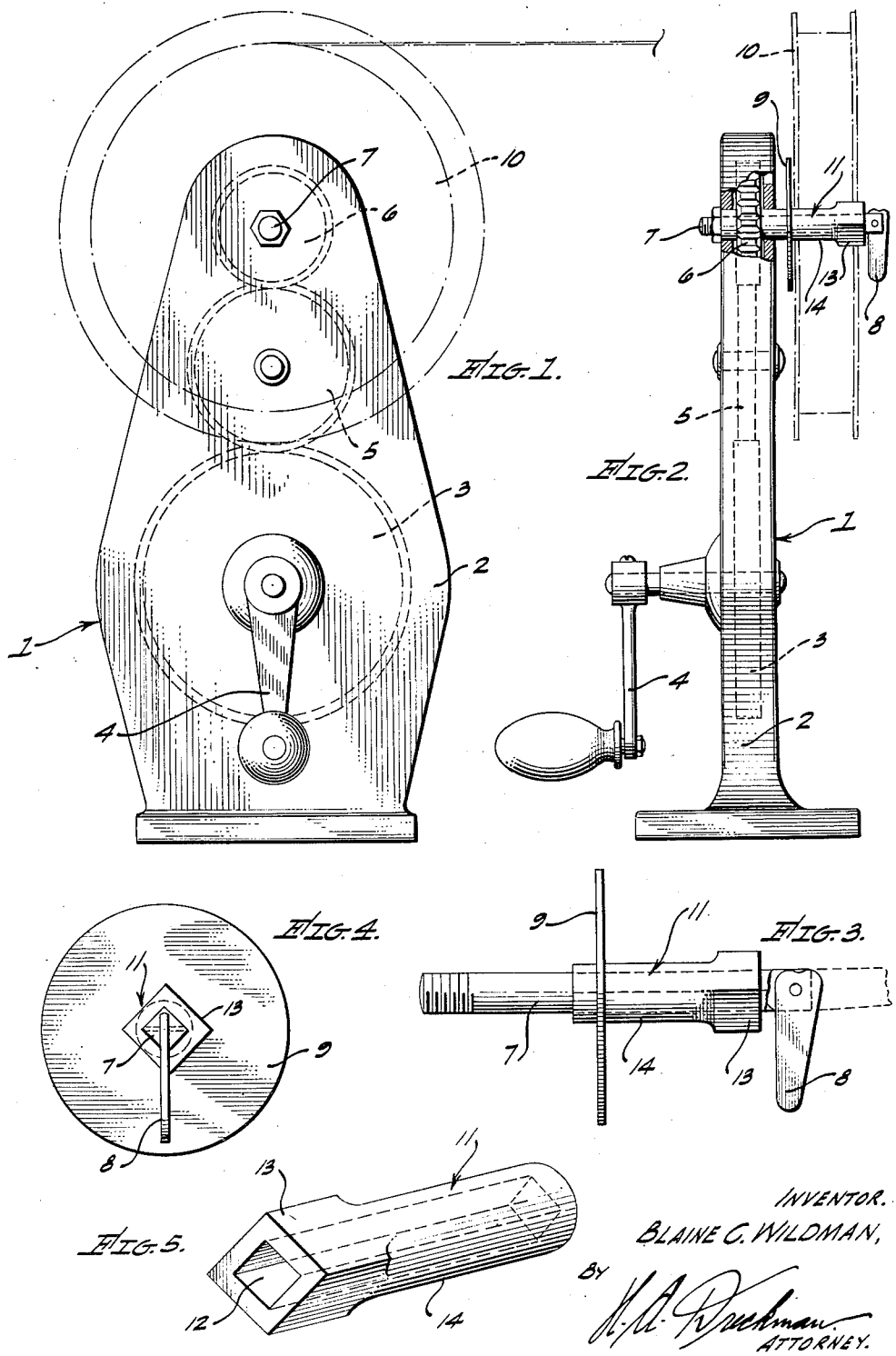
INVENTOR.
BLAINE C. WILDMAN,
BY
ATTORNEY.

2,702,165
ADAPTER SLEEVE FOR MOTION-PICTURE FILM REWINDERS

Blaine C. Wildman, Long Beach, Calif.

Application May 29, 1953, Serial No. 358,300

3 Claims. (Cl. 242—70)

Motion picture film rewinders are so constructed that the film spool will only fit on the driven shaft in one position. This position is such that the film on the spool must be twisted in order to position it correctly for splicing, check viewing, etc.

An object of my invention is to provide an adapter sleeve which can be mounted on the driven shaft of a film rewind mechanism, so that the film spool will be positioned whereby the film thereon does not have to be twisted when splicing, correcting, or check viewing the film.

Another object of my invention is to provide a novel adapter sleeve of the character stated which can be easily and quickly positioned on the driven shaft of a film rewinder and, further, can be arranged on the shaft in two positions, one with the driving surface on the outside and the other with the driving surface on the inside.

A feature of my invention is to provide a novel adapter sleeve of the character stated, which is simple in construction, inexpensive in manufacture and effective in use.

Other objects, advantages and features of invention may appear from the accompanying drawing, the subjoined detailed description and the appended claims.

In the drawing:

Figure 1 is a side elevation of a film rewind mechanism.

Figure 2 is an end view of the same with parts broken away to show interior construction.

Figure 3 is a side elevation of the driven shaft with my adapter mounted thereon.

Figure 4 is an enlarged end view of the driven shaft and the adapter mounted thereon.

Figure 5 is a perspective view of the adapter sleeve.

Referring more particularly to the drawing, the numeral 1 indicates a rewind mechanism which consists of a housing 2 in which there is mounted a driving gear 3 rotated by the crank 4. The gear 3 meshes with an intermediary gear 5 and this gear in turn meshes with the driven gear 6. The driven gear 6 is attached to a driven shaft 7 which extends out of the housing 2 adjacent the upper end thereof. The shaft 7 is square in cross section and is provided with a latch finger 8 at its outer end which holds the spool against endwise movement on the shaft, and also holds the sleeve in position, as will be further described.

A flange 9 on the shaft 7 acts as a stop for the film spool 10 and prevents that spool from moving inwardly against the housing 2. The film spool 10 is formed with a circular hole on one side thereof and a square hole on the other side. This is usual and well known in film rewind spools and, due to the square hole or opening, the position of the spool on the shaft 7 is determined. In order that the film on the spool may be properly viewed, and also for splicing or insertion purposes, it is necessary that the square hole of the spool 10 be on the outside. To accomplish this I provide an adapter sleeve 11 which is formed with a square opening 12 therethrough which fits the shaft 7. One end of the adapter 11 is squared as shown at 13, while the remainder of the sleeve is circular in cross section, as shown at 14. It will be evident that the adapter 11 can be easily mounted on the shaft 7 with the square portion 13 either towards the outside or the inside, and thus the spool 10 can be properly positioned on the rewind mechanism either for splicing or other purposes, in one position of the spool, or to rewind off of a viewing spool, in another position of the rewind spool.

Having described my invention, I claim:

1. An adapter sleeve for motion picture film rewinders comprising an elongated sleeve, flat angularly arranged surfaces on one end of the sleeve, the remainder of said sleeve being cylindrical, and means non-rotatably mounting the sleeve on a driven shaft of a film rewinder, said sleeve being positionable on the driven shaft with the angularly arranged surfaces thereon either on the outer or inner end of said driven shaft.

2. An adapter sleeve for motion picture film rewinders comprising an elongated sleeve, flat angularly arranged surfaces on one end of the sleeve, the remainder of said sleeve being cylindrical, and means non-rotatably mounting the sleeve on a driven shaft of a film rewinder, said means consisting of a square bore extending through the adapter sleeve, said sleeve being positionable on the driven shaft with the angularly arranged surfaces thereon either on the outer or inner end of said driven shaft.

3. An adapter sleeve for motion picture film rewinders, said rewinder including a driven shaft, said shaft being square in cross section, an adapter sleeve fitting on the driven shaft, said adapter sleeve having a square bore to fit the square shaft, the exterior surface of one end of the sleeve being square, the remainder of the exterior of the sleeve being cylindrical, said sleeve being positionable on the driven shaft with the square outer surface of the sleeve arranged either on the outer or inner end of said driven shaft.

References Cited in the file of this patent

UNITED STATES PATENTS

| | | |
|---|---|---|
| 2,528,580 | Colomy et al. | Nov. 7, 1950 |
| 2,548,534 | Hutchison, Jr. | Apr. 10, 1951 |